UNITED STATES PATENT OFFICE.

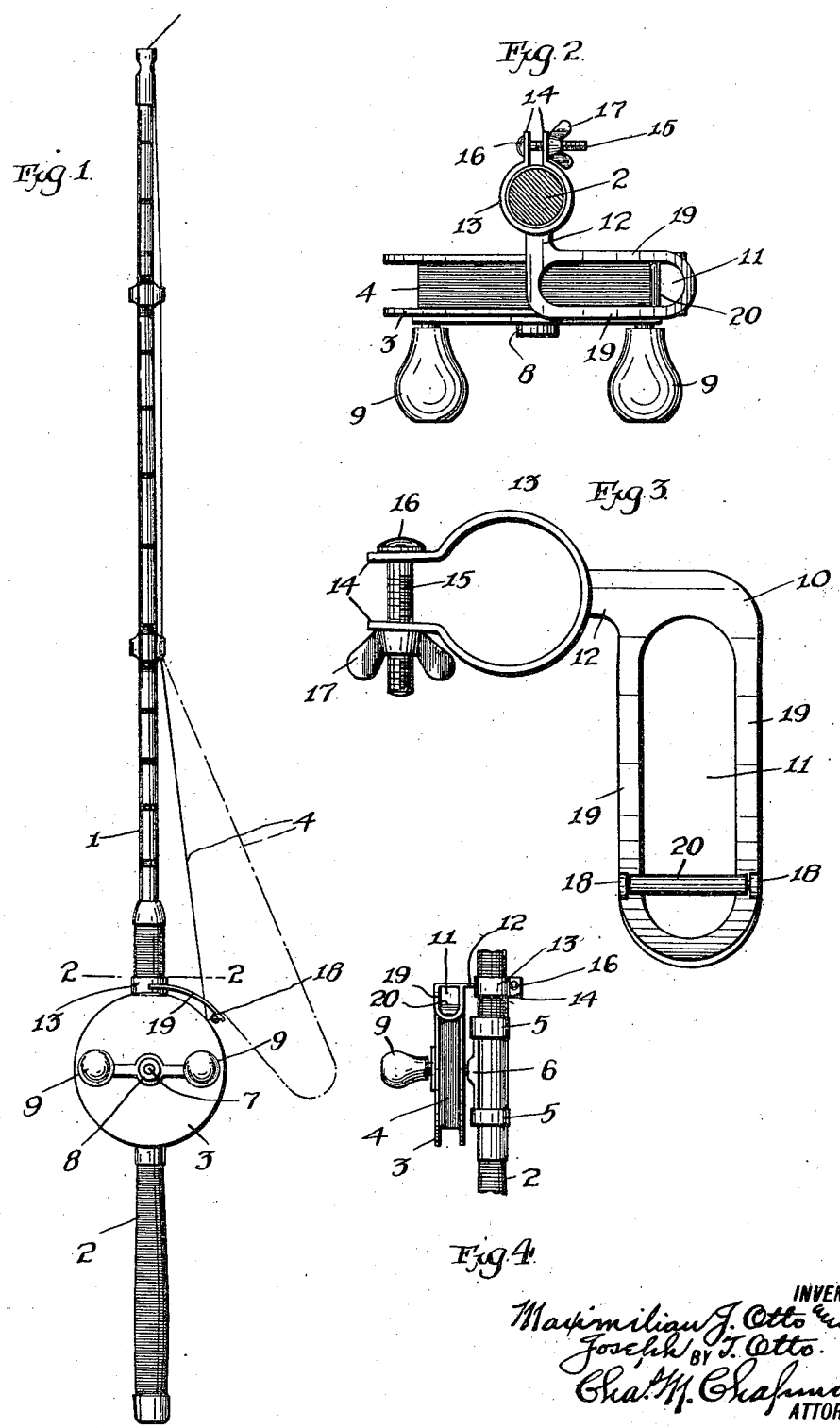

MAXIMILIAN J. OTTO AND JOSEPH T. OTTO, OF NEW YORK, N. Y.

LINE-GUIDE FOR FISHING-REELS.

1,258,804.   Specification of Letters Patent.   Patented Mar. 12, 1918.

Application filed July 3, 1917. Serial No. 178,432.

*To all whom it may concern:*

Be it known that we, MAXIMILIAN J. OTTO and JOSEPH T. OTTO, both citizens of the United States, residing in the borough of Manhattan, city, county, and State of New York, have invented certain new and useful Improvements in Line-Guides for Fishing-Reels, of which the following is a specification.

This invention relates to guiding means for lines for fishing rods or poles and, particularly, relates to a device adaptable to all sizes of rods and capable of preventing the fishing line from entangling or becoming twisted about the journals of the reel.

Among the objects of our invention may be noted the following: to provide means by which the line may be accurately guided to the reel and prevented from being twisted about the journals of the reel on either one side or the other; to provide a line-guide for reels for fishing rods, which may be adapted to any size rod and adjusted along the same to any desired position relatively to the reel; to provide means by which the line may be accurately guided to the reel and caused to be substantially evenly distributed on the reel while winding; and to provide certain details of construction which make the guiding means simple, effective, strong and cheap to manufacture.

With the above objects in view and others which will be detailed during the course of this description, our invention consists in the parts, features, elements and combinations thereof hereinafter described and claimed.

In order that our invention may be clearly understood, we have provided drawings wherein:

Figure 1 is an elevation of the rod and reel thereof, having our guiding device attached thereto;

Fig. 2 is a sectional view on the line 2—2 of Fig. 1, showing the reel and guide in front elevation;

Fig. 3 is an enlarged bottom plan view of the guiding device; and

Fig. 4 is a bottom plan view of the reel and a portion of the rod, showing means for attaching the reel to the rod, and the means for attaching the guide to the rod.

Referring to the drawings, the numeral 1 indicates the rod or pole, 2 the handle thereof, which is usually wound with textile material so as to enlarge the same and provide a grip. The reel is indicated at 3 and the line at 4. The reel is usually detachably mounted upon the rod as by sliding-clips 5 engaging a carrier 6 affording the journal 7 for the reel on which the latter freely turns, but which may be retarded by a frictional device in the form of a screw-threaded nut 8. Handles 9 are provided for winding the line upon the reel.

Our guiding device is shown in details in Fig. 3, and therein the body-portion is shown to consist of an elongated curved member 10, having a slot 11 extending longitudinally thereof, and the curvature of the member being substantially that of the curvature of the periphery of the reel. At one end, the member is provided with an extension 12 at an angle thereto and terminating in a circular clamping collar 13, the terminal ends 14 of which normally extend substantially parallel to each other. The terminal ends have a screw-threaded bolt 15 passing therethrough, one end of which is headed as at 16, and on the screw-threaded end of which is turned the winged thumb-nut 17, the head and the nut operating to draw the parallel ends of the clamp together to cause the circular portion or collar to frictionally engage and tightly clamp the handle of the rod adjacent the reel, as shown in Figs. 1, 2 and 4. By this means, the guiding device can be adapted to any size handle or any size fishing rod and can be adjusted longitudinally of the latter to locate the guiding member properly relatively to the reel. By this means, also, the guiding device is rendered detachable as will be readily understood.

The guiding member at its free end is, preferably, rounded, and near its rounded end is provided with apertured lugs 18 extending at a right-angle to the bars 19 of the member. An anti-frictional roller 20 is journaled in the lugs 18 and is free to turn in the latter in response to light friction applied thereto as the line is run off or on the reel. By extending the lugs from the outer edge of the bars 19 of the guiding member, the said bars shield the journals of the roller and prevent the line from becoming entangled therewith, the bars operating to cover the journals and confine the movements of the line within the elongated slot 11 of the guiding member.

Upon reference to Figs. 1 and 4, the mode of operation will be readily understood, and it will be seen that, in paying off the reel, the line may or may not run in contact with the anti-frictional roll, according to whether the line is taut or slightly slack or becomes slack from rapid paying off. If the line becomes slack, as shown by the dot and dash line of Fig. 1, it cannot, under any circumstance, become entangled with the journal-bearings, one side or the other, of the reel; and in winding the slack line upon the reel, it will be guided invariably over the anti-frictional roller and within the elongated slot of the guiding member and between the bars thereof. Thus also the line cannot become entangled with the journals of the anti-frictional roller, since the journals are well under and shielded by the bars of the guiding member. The roller 20 also has the function of aiding in evenly distributing the line upon the reel in winding, since it presents a smooth, non-frictional surface to the line and the tendency of the latter to pile in one place is thereby overcome. Tangling and breaking the line on the reel is, therefore, overcome.

It will also be understood that the guiding device may be adjusted any distance desired relatively to the reel along the pole; and that, as before noted, it can be adapted to poles of varying sizes. The guiding member can be detached to pack the rod and other parts when required, since it is independent of the reel. This feature is also important because one guiding device can be used with several reels of varying size.

Having thus described our invention, what we claim and desire to secure by Letters Patent is:

1. A line guide for fishing rods, comprising an elongated, longitudinally curved, guiding member, having a line guiding slot therein extending substantially the length thereof, said member being provided with a clamping collar, for encircling a rod, laterally offset from the guiding member and arranged at an angle to the length thereof, the passage through the collar for the rod and the slot in the member for the line being at an angle to each other.

2. A guiding device for lines for fishing rods, comprising a curved, elongated, guiding member for coöperation with the reel and having a longitudinal slot; an anti-frictional guiding means journaled on the said member at one end of the slot and extended across the latter; and means for attaching the device to a rod.

3. A line guide for fishing rods, comprising a slotted member having parallel bars; journal bearings projecting from said bars; an anti-frictional roller journaled in said bearings and extended across the slot, the bars and bearings being arranged to cover the journals when the guide is in place on the rod to prevent the line from becoming entangled with the journals; and means for securing the guide to the rod.

4. In combination with a fishing rod and the reel thereof, a line-guide having a guiding member curved to conform with the periphery of the reel and arranged in advance of the reel close to the latter in the run of the line, and means for adjusting the guiding member on the rod relatively to the reel and for detachably securing said member to the rod.

MAXIMILIAN J. OTTO.
JOSEPH T. OTTO.

Copies of this patent may be obtained for five cents each, by addressing the "Commissioner of Patents, Washington, D. C."